(12) United States Patent
Düvel et al.

(10) Patent No.: US 7,325,205 B2
(45) Date of Patent: Jan. 29, 2008

(54) USE UNIT FOR BANK NOTE PROCESSING MACHINES

(75) Inventors: Volker Düvel, Germering (DE); Hans Bomm, Taufkirchen (DE); Raimund Herberg, Boulder, CO (US)

(73) Assignee: Giesecke & Devrient GmbH, Munich (DE)

( * ) Notice: Subject to any disclaimer, the term of this patent is extended or adjusted under 35 U.S.C. 154(b) by 541 days.

(21) Appl. No.: 10/148,216

(22) PCT Filed: Dec. 6, 2000

(86) PCT No.: PCT/EP00/12295

§ 371 (c)(1),
(2), (4) Date: Aug. 27, 2002

(87) PCT Pub. No.: WO01/43083

PCT Pub. Date: Jun. 14, 2001

(65) Prior Publication Data

US 2003/0038847 A1    Feb. 27, 2003

(30) Foreign Application Priority Data

Dec. 8, 1999    (DE) ................................ 199 59 218

(51) Int. Cl.
*G06F 3/00* (2006.01)
*G06F 9/00* (2006.01)
*G06F 17/00* (2006.01)

(52) U.S. Cl. ...................... 715/835; 715/854; 382/124

(58) Field of Classification Search .............. 715/773, 715/835, 840, 845, 976, 977, 701, 702, 741, 715/742, 743, 727, 728, 729; 705/1, 16, 705/17, 18, 21, 35, 40, 43, 44; 235/379, 235/381, 382, 382.5; 156/173
See application file for complete search history.

(56) References Cited

U.S. PATENT DOCUMENTS

| 4,134,537 A | 1/1979 | Glaser et al. |
| 4,310,839 A * | 1/1982 | Schwerdt .................... 345/173 |

(Continued)

FOREIGN PATENT DOCUMENTS

DE    196 04 323 A1    8/1996

(Continued)

OTHER PUBLICATIONS

Patent Abstracts of Japan, Publication No. 05324989 A, published Oct, 12, 1993; Japanese Patent Office.

(Continued)

*Primary Examiner*—Kristine Kincaid
*Assistant Examiner*—Boris Pesin
(74) *Attorney, Agent, or Firm*—Bacon & Thomas, PLLC

(57) ABSTRACT

The invention relates to an apparatus and method for processing bank notes, in particular for singling, counting, sorting and testing the authenticity of bank notes or papers of value, which can be operated in a plurality of operating modes and wherein a display device is provided for selecting and displaying the operating modes. Such an apparatus and method are to be improved in such a way that the operator prompting can be learned easily and fast, without any sacrifice of flexibility. This is obtained by designing the display device to display icons having variable functions associated therewith that arc selectable by an input device.

13 Claims, 2 Drawing Sheets

U.S. PATENT DOCUMENTS

| | | | |
|---|---|---|---|
| 5,183,142 A * | 2/1993 | Latchinian et al. | 194/206 |
| 5,185,515 A * | 2/1993 | Nishibe | 235/379 |
| 5,369,469 A * | 11/1994 | Leo et al. | 399/8 |
| 5,410,326 A | 4/1995 | Goldstein | |
| 5,544,302 A | 8/1996 | Nguyen | |
| 5,841,959 A * | 11/1998 | Guiremand | 345/440 |
| 5,892,503 A | 4/1999 | Kim | |
| 5,943,655 A * | 8/1999 | Jacobson | 705/30 |
| 5,982,918 A * | 11/1999 | Mennie et al. | 382/135 |
| 6,023,688 A * | 2/2000 | Ramachandran et al. | 705/44 |
| 6,061,666 A * | 5/2000 | Do et al. | 705/43 |
| 6,149,055 A * | 11/2000 | Gatto | 235/379 |
| 6,230,928 B1 * | 5/2001 | Hanna et al. | 221/13 |
| 6,476,833 B1 * | 11/2002 | Moshfeghi | 715/854 |
| 6,630,941 B1 * | 10/2003 | Addison | 715/702 |
| 6,761,308 B1 * | 7/2004 | Hanna et al. | 235/379 |
| 2003/0132288 A1 * | 7/2003 | Fulcher et al. | 235/381 |
| 2004/0135801 A1 * | 7/2004 | Thompson et al. | 345/702 |
| 2005/0289055 A1 * | 12/2005 | Drummond et al. | 705/43 |

FOREIGN PATENT DOCUMENTS

| | | |
|---|---|---|
| DE | 196 36 677 A1 | 4/1998 |
| EP | 0 593 386 A2 | 4/1994 |
| GB | 2 247 097 A | 2/1992 |
| GB | 2 276 520 A | 9/1994 |
| WO | WO 99/09511 | 2/1999 |
| WO | WO 99/28847 | 6/1999 |
| WO | WO 99/44380 | 9/1999 |

OTHER PUBLICATIONS

Patent Abstracts of Japan, Publication No. 58168059A, published Apr. 10, 1983; Japanese Patent Office.

* cited by examiner

USE UNIT FOR BANK NOTE PROCESSING MACHINES

BACKGROUND

This invention relates to an apparatus and method for processing bank notes, in particular for singling, counting, sorting and testing the authenticity of bank notes or papers of value.

For bank note processing machines and money counting machines it is known to use a display and a keyboard input unit for inputting commands and selecting certain processing operations and for progress displays or help displays.

An improvement with respect to operator friendliness is obtained with an input device and display device according to the international application WO 99/09511. This laid-open print states a bank note processing machine for recognizing, testing and/or counting bank notes. Said bank note processing machine contains a touch-sensitive screen constructed from a matrix of optically transparent switch elements which is disposed over the display unit. The selection elements are indicated by the display so that the operator can make a corresponding selection by pressing on the transparent switch elements. The display is simultaneously used for displaying status information or for help information. A thus constructed operator prompting is very flexible in application since it can easily be adapted to given or changing requirements. Despite the easy adaptability of the operator prompting with the touch-sensitive display as known from WO 99/09511, it has the disadvantage that the operator is still prompted by means of text. For international application, the machines must thus be adapted to the particular national language. No simple and intuitive operator prompting is possible.

SUMMARY

It is therefore the problem of the invention to state a bank note processing machine whose operator prompting is readily understandable and intuitively learnable.

According to the invention it is provided that the display unit displays variable functions by symbols (icons), whereby the individual, selectable functions can be selected by input means.

This has the advantage that the operator prompting is very easy to grasp visually, i.e. the operator can see at first glance by the symbols (icons, etc.) or image sequences representing a course of procedure or help function sequence the functions behind them. A corresponding function selection can be made intuitively without requiring any lengthy training phase for the operator. Skillful design or selection of the symbols makes the individual functions self-explanatory without any further written elucidation. It is thus largely unnecessary to adapt the operator prompting to the particular national language.

According to an advantageous embodiment of the invention, it is provided that the operator interface is divided into two areas. The first area contains a function menu designed for selecting general commands, while the second part contains an operator menu for making the command selection for the bank note processing apparatus.

Dividing the operator interface into a function menu and an operator menu further simplifies the operation of the bank note processing machine since the input possibilities are separated in accordance with their function.

It has proved advantageous to use the display unit for displaying the operator menu, while the function menu is realized completely or partly by separate input means (keyboard, mouse, etc.). A keyboard layout and/or the possible activations of keys can be displayed on the display unit.

Said separation advantageously permits the area of the display device containing the function menu to also be of touch-sensitive design. In this case, the symbols from the operator menu area can be selected by means of the touch-sensitive elements from the function menu. The selected symbols from the operator menu are advantageously displayed inversely. The input unit is realized by a transparent switch matrix disposed over the display unit. The transparent switch matrix can also extend over the total area of the display unit so that inputs relating to the operator menu can be made directly by pressing on a transparent switch element disposed over the displayed symbol.

A further advantageous embodiment of the invention results by disposing a fingerprint sensor in the touch-sensitive display device. This assembly ensures in simple fashion that only authorized persons are permitted to operate the bank note processing apparatus. The fingerprint is used for an authentication test, i.e. the determined fingerprint is compared with the fingerprints of authorized persons contained in a memory of the bank note processing apparatus. If a determined fingerprint matches a stored one, operation of the bank note processing machine is permitted, otherwise the functions cannot be executed or only in part.

In addition to simplifying the operator prompting by symbolic display of processing operations or functions, simple operator prompting can also be obtained if the bank note processing machine contains an acoustic input and output device permitting both function or operator commands to be entered by voice input and status or error messages to be indicated by voice output. This embodiment does again require country-specific adaptation of the machines, but it provides simple and readily understandable operator prompting.

The inventive method provides that functions and operator commands are selected either by keys whose functions and possible activations are displayed on the display panel, or by pressing on transparent switch elements, the functions or commands being displayed by symbols on a display unit located under the transparent switch elements. Advantageous embodiments of the method result from the dependent claims.

In particular, the recording of the fingerprint can also be used for effecting operator-unique defaults. The recorded fingerprint is associated with one operator. From this association, user-unique defaults can be loaded which are made available as the initial menu. Said defaults can of course be changed for further operation. Similarly, the fingerprint can also be used to enable a limited function selection so that not all functions of the bank note processing machine are enabled for all users.

BRIEF DESCRIPTION OF THE DRAWINGS

In the following, the invention will be explained in more detail with reference to FIGS. 1 to 3, in which.

DETAILED DESCRIPTION OF VARIOUS EMBODIMENTS

Figure 1:
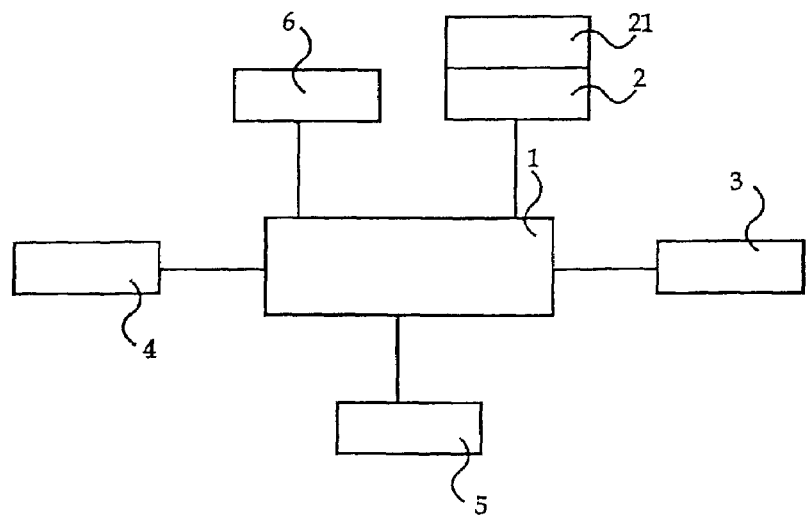
FIG. 1 shows a block diagram of the inventive apparatus.

FIG. 1 shows in simplified form a block diagram of an inventive bank note processing machine, indicating only the elements relevant to the invention.

Display device 2 having operating unit 21 associated therewith is connected with central control unit 1, normally the CPU (central processing unit) of the bank note processing machine.

The central control unit is further connected with ROM 5 and nonvolatile memory 4 as well as drive elements 3 for driving the individual function units of the bank note processing machine.

Nonvolatile memory 4 stores not only the usual program data but also the symbols to be displayed on the display device.

Display/operator module 2, 21 may consist of a display unit suitable for displaying symbols and an operating unit, whereby operating unit 21 may be a keyboard, a transparent switch matrix superimposed on display device 2, or the like.

Alternatively or additionally, the inventive apparatus may also contain acoustic voice input/output unit 6 for inputting operator commands or menu selection commands by means of a microphone. Error messages or status messages may accordingly be transmitted to the operator by voice output.

A combined visual and acoustic operator prompting can provide that at least simple function commands, for example cursor movements, are effected by means of voice input, while the other commands are inputted by the touch-sensitive switch elements on the display unit or accordingly associated separate keys.

Figure 2:
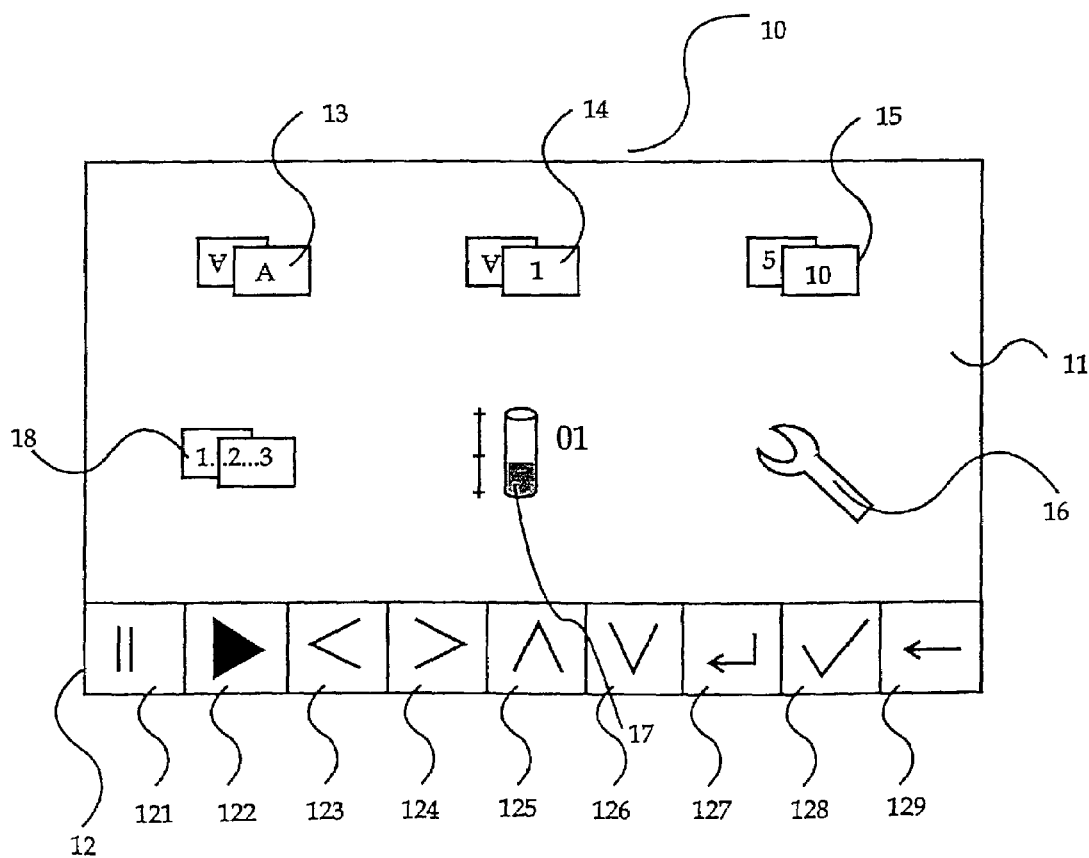
FIG. 2 shows a touch-sensitive display device of the invention.

FIG. 2 shows, without limiting the generality, an example of the screen structure of touch-sensitive display device 10. The display device consists substantially of a known display device with a transparent switch matrix superimposed thereon. The switch matrix is divided into different segments having certain functions associated therewith by association by means of the display unit. The association is effected by the central control unit in connection with the data stored in the nonvolatile memory.

Touch-sensitive display device 10 is preferably divided into function menu 12 and operator menu 11. Function menu 12 contains general functions serving to drive the bank note processing machine, such as starting a selected function with key 122 or stopping it with key 121. Further, the function menu contains keys for controlling the operator menu, such as cursor keys 123 to 126, enter key 127 for selecting a menu level of the operator menu, or selection key 128 for selecting a function of the operator menu. Further, correction key 129 is provided in the shown example.

Besides function menu 12, the touch-sensitive display device according to FIG. 2 contains operator menu 11. Just as in function menu 12, the individual menu items are displayed in the operator menu by language-independent symbols. For example, at 14 one can see the symbol for face sorting. In this sort mode, the bank notes are sorted according to the direction of a picture or writing disposed thereon.

Further, the menu displays position sorting symbol 13. In this sort mode, the position of a first singled bank note is used as a reference position. The position of the next bank note that does not match the reference position of the first bank note is used as a second reference position. In the bank note sorter the bank notes are then deposited in the different singling pockets in accordance with their various positions.

A further sort mode is given by denomination separation, which is marked by symbol 15 in the menu. This sort mode also makes use of first and second reference bank notes. The denomination of the first singled bank note serves as the first reference denomination, while the denomination of the next bank note that does not match the reference denomination of the first bank note is used as the second reference denomination.

Symbol 18 represents the selection of the count mode. Solely the number of singled bills is counted here without heeding any other criteria, for example position or denomination. The stackers contained in the bank note processing machine work in tandem operation, for example in the case of two stackers. When the count mode symbol is selected, a counter field (not shown in the Figure) is displayed therebelow that states the number of counted bank notes.

The operating mode of the bank note processing machine is selected with symbol 17. Substantially three operating mode classes are available. The first class is given by the batch mode, which contains the denomination count, reject entry and result report. The second operating mode class is the deposit mode. This mode comprises the denomination count, reject entry, over/short calculation and result report. The third class is formed by the fitness mode, which is strictly a quality sort. The individual operating mode classes thus contain a plurality of individual operating modes that offer different possibilities of configuration. These possibilities of configuration are selected with the aid of the symbol for configuration menu 16. Different adjustments can be made here, such as setting the quality threshold values for each denomination, and selecting the authenticity features likewise done for each denomination. Further, the operating modes can be defined in configuration menu 16 according to position, denomination, quality, stacker configuration, etc. In addition, general adjustments can be made in the configuration menu, such as setting the date/time, the display contrast, etc.

Figure 3:
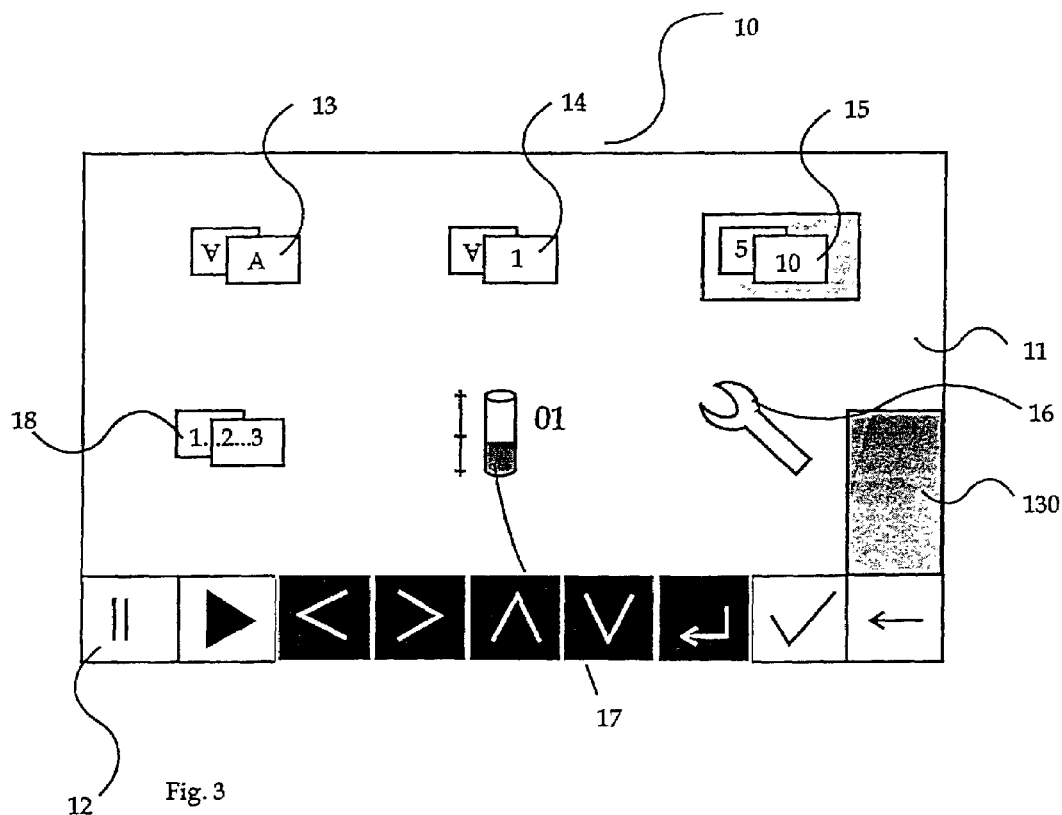
FIG. 3 shows a touch-sensitive display device with an activated function.

FIG. 3 shows a touch-sensitive display device corresponding substantially to that of FIG. 2. The differences of FIG. 3 over FIG. 2 result substantially from providing fingerprint sensor 130, which is shown on the lower right side of the operator menu. The fingerprint sensor serves to record the fingerprint, which permits the user to call up different functions, on the one hand, or to operate the bank note processing machine at all. Further, the currently usable command keys, in the present case the cursor movement key and selection key, are displayed inversely in the function menu. The currently selected menu item 15 is underlaid by a border in the operator menu. Said menu item can be selected by selection key 127.

If not only function menu 12 is equipped with transparent, touch-sensitive switch elements, but the complete display device, i.e. also operator menu 11, is covered with transparent switch elements, a menu item, for example denomination separation 15, can also be selected directly by pressing on the corresponding symbol.

It is likewise possible to associate separate keys with the display panel, their functions being displayed by symbols provided on the keys or their functions being rendered in associated fields of the display unit. In the latter case, the functions of individual keys can also be easily changed and said change made recognizable by accordingly adapting the symbols of the display fields.

Figures 4A, 4B:
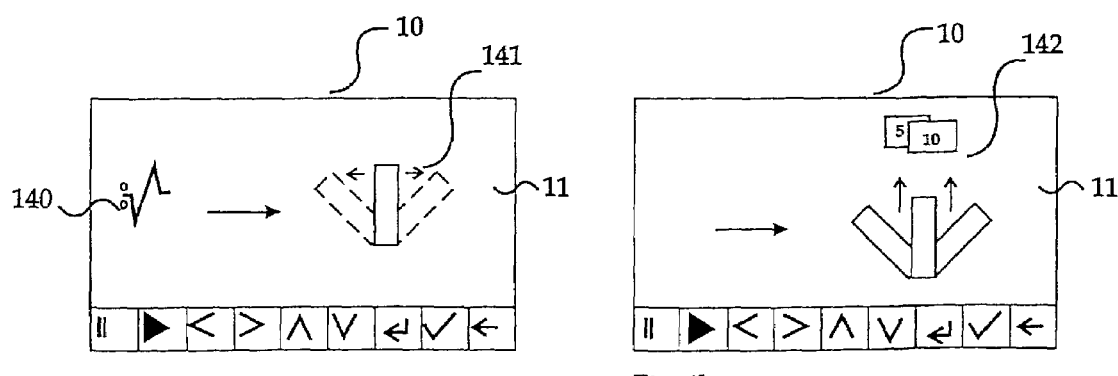
FIG. 4 shows a help function sequence.

FIG. 4 finally shows an example of the operator prompting of a help function sequence for eliminating a bank note jam in the bank note processing machine with reference to the first two steps. First, the jam is indicated by symbol 140, as shown in FIG. 4a, whereby symbol 141 simultaneously indicates that the operator must first open the outer housing parts. FIG. 4b shows the next step whereby the operator is told by symbol 142 that the jammed bank notes are to be removed. In further steps not shown in FIG. 4, the operator is instructed by symbolic representations to remedy the cause of the error completely.

The invention claimed is:

1. An apparatus for processing bank notes arranged for singling, counting, sorting and testing the authenticity of bank notes and papers of value, and operable in a plurality of operating modes, including a batch mode, a deposit mode, and a fitness mode, each of the operating modes including a plurality of functions, the individual operating modes being displayable on a display device, wherein said display device is arranged to display non-language specific icons which are configurably associated with said functions and which are selectable to perform an associated function, wherein certain of said icons may be associated with one or more of said functions by user definition;

wherein said functions include at least one from the group consisting of a denomination count function, a reject entry function, a result reporting function, an over/short calculation function, and a sorting function;

wherein the display device contains a fingerprint sensor arranged to record a user's fingerprint; and wherein an initial set of said non-language specific icons are displayed according to the user's fingerprint.

2. The apparatus according to claim 1, including an operator interface divided into a function menu and an operator menu, the function menu is arranged to enable selecting general commands and the operator menu containing the command selection for the different operating modes of the bank note processing apparatus.

3. The apparatus according to claim 1 or 2, wherein the display unit has a keypad associated therewith and a key layout and/or the possible activation of keys of the keypad is displayed by the display panel.

4. The apparatus according to claim 2, wherein at least the area of the display device containing the function menu is of touch-sensitive design, said touch-sensitive area being divided into a plurality of segments each having a specific function associated therewith by an underlying icon of the display unit.

5. The apparatus according to claim 4, wherein said fingerprint sensor is contained in said touch-sensitive area.

6. The apparatus according to claim 1, including an acoustic input and output device that is arranged to receive function or operator commands and to output status messages.

7. A method for processing bank notes, including singling, counting, sorting and testing the authenticity of bank notes and papers of value, and operating in a plurality of operating modes including a batch mode, a deposit mode, and a fitness mode, each of the operating modes including a plurality of user-defined or adjusted functions, and using a touch-sensitive display device for selecting and displaying the operating modes, the display device containing a fingerprint sensor arranged to record a user's fingerprint, the method comprising the steps of:

selecting functions or operator commands to be selected with the aid of non-language specific icons displayed on the display device, and effecting the selection by an input unit or specific device functions; and displaying an initial set of said non-language specific icons according to the user's fingerprint;

wherein the icons are configurably associated with said functions of the operating modes such that certain of said icons may be associated with one or more of said functions by user definition; and wherein said functions include at least one from the group consisting of a denomination count function, a reject entry function, a result reporting function, an over/short calculation function, and a sorting function.

8. The method according to claim 7, wherein the selection is effected by pressing on a touch-sensitive, transparent switch matrix divided into segments and disposed over the icons displayed by the display unit, a function being selectable by actuating a transparent switch over the icon.

9. The method according to claim 7 or 8, wherein the operator interface is divided into a function menu and an operator menu, the selection of general commands being effected by the function menu, and the command selection for operating the bank note processing apparatus being executed by the operator menu.

10. The method according to claim 9, wherein the function and operator commands are selected or executed only by the area of the display device containing the function menu.

11. The method according to claim 7, wherein an access authorized operator is authenticated by a fingerprint, recorded by means of the touch-sensitive display device and only access authorized persons are permitted to operate the bank note processing apparatus.

12. The method according to claim 11, wherein an initial set of said non-lanugage specific icons are displayed according to the user's fingerprint upon identification of an authorized operator by the fingerprint.

13. The method according to claim 7, including the use of an acoustic input and output device to receive function or operator commands and to output status messages.

* * * * *